United States Patent [19]

Burkhart

[11] Patent Number: 5,310,231
[45] Date of Patent: May 10, 1994

[54] SHOVEL DEPTH DETERMINER

[76] Inventor: Glenn E. Burkhart, 4643 Oakbough Way, Carmichael, Calif. 95608

[21] Appl. No.: 912,990
[22] Filed: Jul. 14, 1992
[51] Int. Cl.$^5$ ................................................. A01B 1/02
[52] U.S. Cl. ......................................... 294/59; 172/239
[58] Field of Search .................... 294/49, 50.7, 59, 60; 33/624, 625; 111/106; 172/239

[56] References Cited

U.S. PATENT DOCUMENTS

| | | | |
|---|---|---|---|
| 77,930 | 5/1886 | Stevenson | 294/49 |
| 836,541 | 11/1906 | Spriggs | 294/60 X |
| 1,027,345 | 5/1912 | Lapin | 294/49 |
| 1,279,031 | 9/1918 | Sprott | 33/624 |
| 1,783,026 | 11/1930 | Ober | 294/59 X |
| 2,199,072 | 4/1940 | Garabrant | 294/49 |
| 2,447,216 | 8/1948 | Tidwell | 294/49 |
| 2,503,408 | 4/1950 | Phillps | 33/624 |
| 3,045,355 | 7/1962 | Woods | 33/624 |
| 3,127,689 | 4/1964 | Hopkins | 172/783 X |
| 3,266,050 | 8/1966 | Reeder | 172/797 X |
| 3,273,930 | 9/1966 | Gottfried | 294/50.7 X |
| 3,506,296 | 4/1970 | Nelson | 294/60 X |
| 4,198,090 | 4/1980 | Gutman | 294/58 |
| 4,215,495 | 8/1980 | Wagner | 172/239 X |
| 4,804,219 | 2/1989 | Berg | 294/59 X |
| 5,048,883 | 9/1991 | Waluk | 294/58 |
| 5,065,475 | 11/1991 | Watt | 294/58 |

FOREIGN PATENT DOCUMENTS 124360 3/1919 United Kingdom ................. 294/59

Primary Examiner—Dean J. Kramer
Attorney, Agent, or Firm—Robert T. Kloeppel

[57] ABSTRACT

An improvement to a shovel used while grading or cleaning out the area adjacent to a previously constructed surface such as a curb and gutter adjacent to a road bed comprising a guide for fixing the depth the shovel blade can penetrate the soil, aggregate, or other debris adjacent to the previously constructed surface so that when the shovel is moved parallel to the structure when the guide is located on top of the structure the debris is cleared away. The guide is rotatably and slidably connected to the handle of the shovel so that: (a) the guide can be located any where along the shovel handle to set the distance the guide is above the shovel blade's lower end and (b) the guide can be located on either side of the shovel blade.

17 Claims, 3 Drawing Sheets

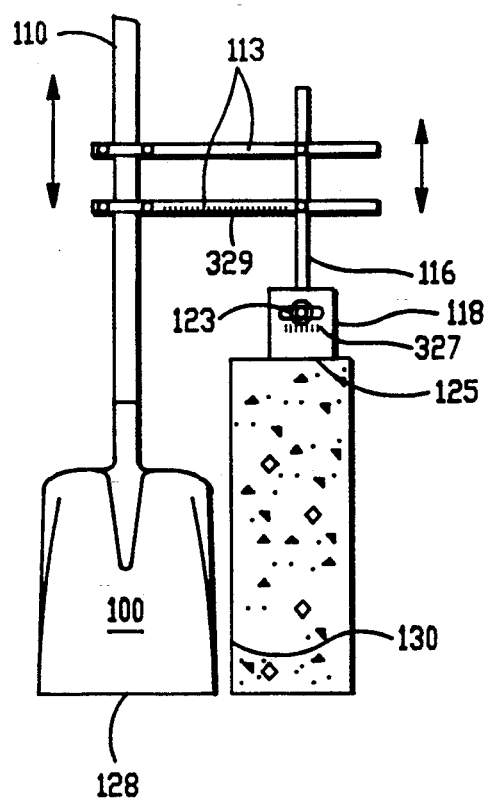
FIG.—4
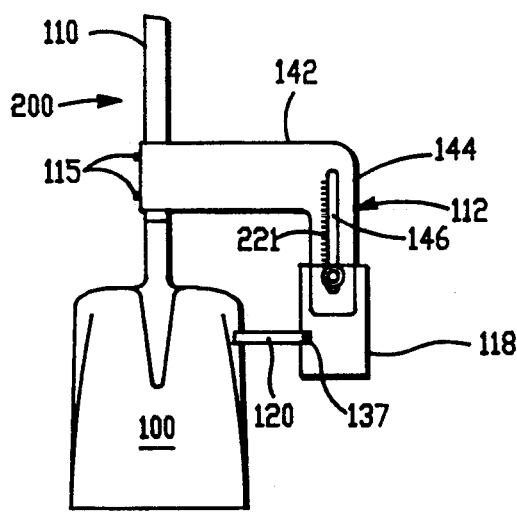
FIG.—5
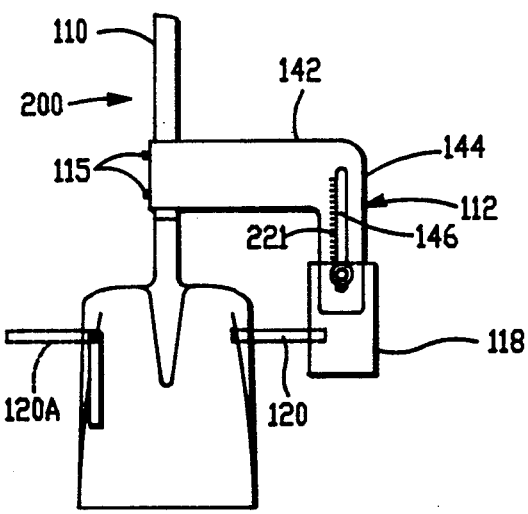
FIG.—5A
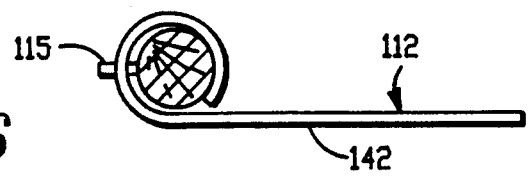
FIG.—6

SHOVEL DEPTH DETERMINER

BACKGROUND OF THE INVENTION

1. Field of the Invention

This invention relates to an improved shovel that predetermines the depth that the shovel blade will clear away the soil to achieve a uniform grade for a road bed or other surface which is adjacent to a previously located structure such as a curb.

2. Description of the Prior Art

When roads are constructed, a curb and gutter are first formed. Then the road bed is graded prior to laying the road surface or asphalt concrete. In order to bring the subgrade or aggregate base of the road bed adjacent to the curb to the specified elevation, a laborer is required to dig away aggregate or other debris from the area adjacent to the gutter which is integral with the curb. This is done because the grader or other mechanical equipment required to complete the grade cannot move close enough to the gutter to remove the debris without damaging the curb and gutter previously constructed. The laborer is required to continually bend down and with a measuring instrument locate the depth of the soil or debris to be removed by inserting the measuring instrument into the soil. After this is done, the laborer stands erect and removes the aggregate, repeating this procedure along the entire length of the previously formed curb and gutter. This procedure is time consuming, back breaking and inaccurate. The time consuming and back breaking nature of the current manner of doing work occurs because of the repetitious bending and straightening required by the laborer. The inaccuracy occurs as each penetration of the measuring instrument differs. This inaccuracy is compounded if the intervals that the measuring instrument is used is infrequent.

A study of the prior art did not disclose any invention or patent that eliminates the time consuming, back breaking and inaccurate work that my invention does.

SUMMARY OF THE INVENTION

The invention is an attachment to a shovel that fixes the depth the shovel will penetrate the surface of the soil or debris to be removed by it. This invention is useful in the construction industry and more specifically in the construction of roads or airstrips. It may also be useful to landscapers in preparing or cleaning away the trench in which sprinklers or electrical lines are to be located.

When a shovel is equipped with the invention, the depth of penetration of the shovel is preset so that when the laborer moves parallel to the curb or other previously constructed structure the grade adjacent thereto remains constant.

My invention includes a shovel with a shovel blade and shovel handle. The depth the shovel blade clears away the soil adjacent to the curb edge or other surface is determined by the height the bottom edge of a guide means is above the bottom of the shovel blade. The guide means may be slidably connected to a vertical guide which in turn is held parallel to the shovel blade by adjustable brackets or other means which may rotate about the shovel handle so that the guide means may be located on either side of the shovel blade closest to the curb. The guide means may be held parallel to the shovel blade by at least one horizontal member that is rotatably secured to the shovel blade. The horizontal member presses against the shovel blade as the user of the shovel walks parallel to preconstructed structure with the shovel blade embedded in the soil. Alternatively, the guide means itself may extend onto the shovel blade itself to achieve the same effect.

To repeat, when the user of my invention moves parallel to a structure such as a preformed curb, he pushes away excess aggregate or soil with the shovel blade. During this time, the guide means is kept parallel to the shovel blade by the horizontal members as the guide means glides over the structure. The height of the guide means bottom above the shovel blade bottom determines the depth the shovel blade penetrates the soil and in turn clears away the soil.

The adjustable brackets are slidably connected to the shovel handle. By moving up or down the brackets, the guide means is correspondingly moved up or down the handle. This feature is useful when the curb depth plus the depth of the soil to be removed is greater than the shovel blade height. When the correct location of the guide means above the shovel blade bottom is determined, the guide means is secured in that location by tightening the bolts and nuts that secure the brackets to the handle and to the guide means.

If it is important to move the guide means to the other side of the shovel blade, the adjustable brackets are rotated about the shovel handle and locked into position.

Another embodiment of my invention may be removably connected or fabricated integral to the shovel blade on one or both sides of the shovel blade.

I have found my invention to be a most effective way to remove aggregate, soil or other debris that is located adjacent to the gutter of a curb and gutter combination or a previously laid concrete or asphalt strip or slab. (In the Description of the Preferred Embodiment and the claims, "soil" means soil, aggregate, other debris, any or all of them.) When the laborer secures my invention properly to a shovel or uses a shovel so equipped and walks parallel to the curb and gutter or concrete or asphalt strip of an airplane landing strip, or road bed, etc., the grade adjacent to them becomes a uniform elevation as the excess aggregate is pushed aside by the shovel blade.

DESCRIPTION OF THE DRAWINGS

FIG. 4 illustrates the invention in elevation with a surface considerably higher than the shovel blade depth.

FIG. 5 is an elevation view of the invention which illustrates the connection and vertical guide means fabricated in one piece.

FIG. 5a is an elevation view of the invention illustrated in FIG. 5, which is modified to show the horizontal member connected to the shovel blade instead of to the guide means.

FIG. 6 is top view of the connection means wherein the side adjacent to the handle is rolled to conform to the handle.

DESCRIPTION OF THE PREFERRED EMBODIMENT

Figure 1:
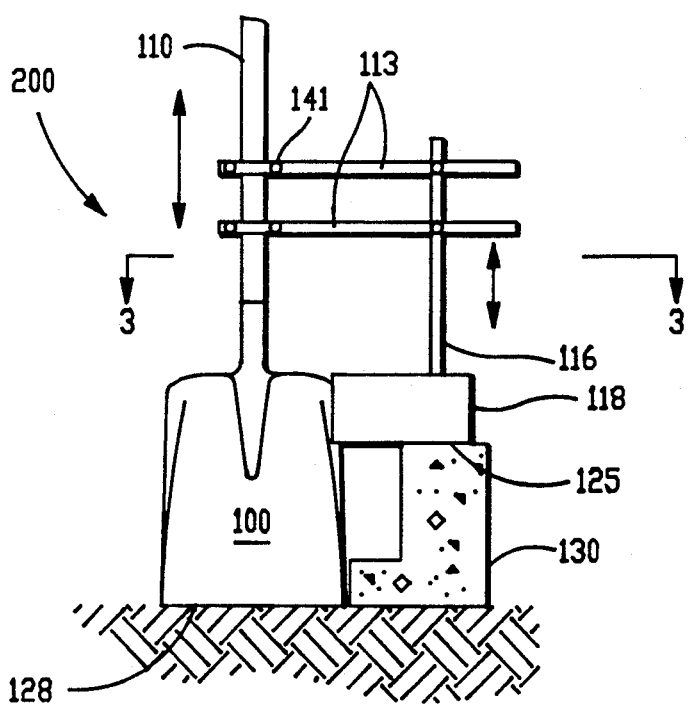
FIG. 1 illustrates the invention in elevation.
Figure 2:
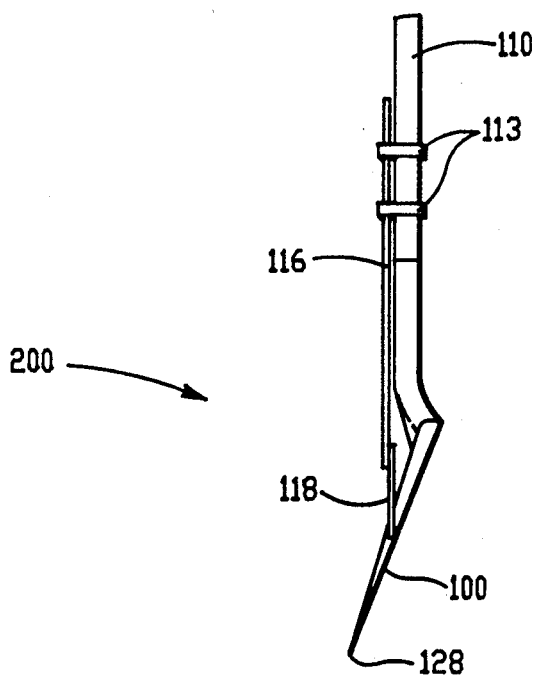
FIG. 2 illustrates the invention in a side view.
Figure 3:
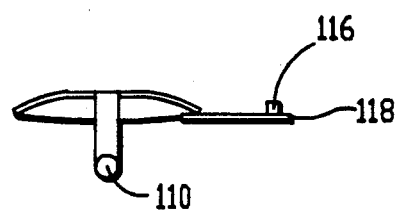
FIG. 3 illustrates a top view of the invention.

My invention is illustrated in FIGS. 1 through 9. My invention as shown in FIGS. 1, 2, and 3 is an improvement to a shovel 200 which has a shovel blade 100 and handle 110 connected to and extending from the shovel blade. The improvement includes a guide means 118 for fixing the depth of the shovel blade and in turn the amount of soil it can clear away. The guides means may be constructed from plastic or sheet metal. The bottom edge 125 of the guide means is secured so that it is at an elevation that is parallel to a line that is tangent to the bottom edge 128 or lower end of the shovel blade 100, FIG. 1. Or if the shovel is pointed or rounded, the bottom edge of the guide means is at an elevation that is on a line parallel to the tangent of the lowest point of the shovel blade. The elevation is predetermined by the user of the invention to result in the shovel penetrating the soil or fill adjacent to the curb for the depth that is required to obtain the desired grade.

As mentioned, fixing the shovel blade to a predetermined elevation above the shovel blade bottom is accomplished by setting the guide means 118 so that it rests on a previously constructed structure 130, FIG. 1, while the lower end of the shovel blade is embedded to the desired depth of the soil adjacent to the structure. (Thus, the depth of the shovel blade clears soil away is a function of the distance between the top surface of the previously constructed structure and the lower end of the shovel.) For the purposes of this description and the claims, "previously constructed structure" means any structure or surface that has been constructed or exists such as by the way of example a curb, gutter, pavement, trenches, aprons, and so on which require a substantially uniform grade to be constructed immediately parallel to it. The guide means is then secured to the shovel, as will be described, at a height so that when a user of my invention walks parallel to the curb or concrete or asphalt strip 130, the grade adjacent to it is cleared of aggregate, soil, or debris to a predetermined depth the shovel blade is allowed to penetrate the soil. The connection means for connecting the guide means to the shovel may include a pair of brackets 113 connected at one end to a vertical guide means 116 and at the other end to the handle 110. This end is adjustably secured to the handle by a pair of brackets encircling the handle 110 secured by bolts 141 as shown in FIG. 1.

Another embodiment is illustrated in FIG. 5. The guide means is connected to the handle 110 of the shovel 200 by a connection means 112 so that it is rotatable about the handle 110. This allows the user to put the guide means 118 on the side of the shovel closest to the curb or other previously constructed structure by simply rotating the guide means about the handle. The connection means is a member having an integral vertical portion 144 and horizontal portion 142. The vertical portion end connects to the guide means and the horizontal portion is connected to the handle as will be described. The connection means 112 is then locked or secured in this position by securing means or set screws 115. In the simplest form of my invention, the connection means can be fabricated from sheet metal. As shown in FIG. 6, the end of the sheet adjacent to the shovel handle is fabricated so that it circumscribes or encircles the handle and is slidably and rotatably located on the handle until it is secured by the user by securing means such as the set screws or other mechanical fasteners which are screwed against or into the handle to hold the guide means in place. When the set screws 115 are loosened, this connection means may either be moved up and down the shovel handle so as to obtain the correct elevation of the guide means 118 above the shovel blade bottom and/or rotated to the appropriate side of the shovel blade.

Figure 9:
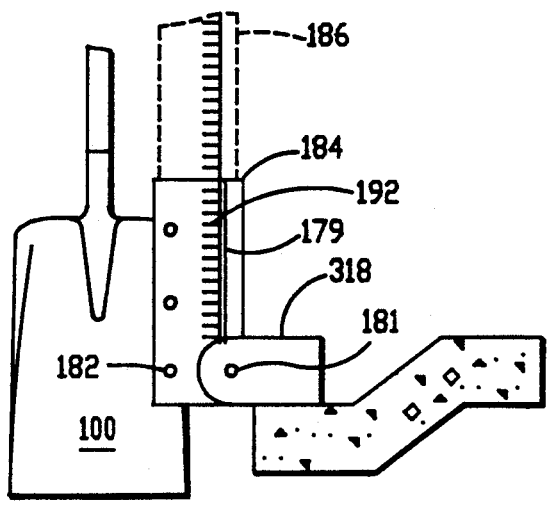
FIG. 9 illustrates the invention illustrated in FIG. 8 with a graduated scale.

The ability to move the connection means up and down the handle is a feature that is important to accommodate varying depths of the adjacent structure upon which the guide means 118 moves along. The connecting means may also have a slot not shown (or rod 113 as shown in FIG. 1 or other means known by those skilled in the art) substantially perpendicular to the shovel handle 110. This slot or rod allows the guide means to be moved in a direction perpendicular to the shovel so that when the shovel blade bottom is at the desired elevation the guide means rests on the previously constructed structure. Alternatively, a slot 123, FIG. 4, perpendicular to the shovel blade may be fabricated in the guide means 118 so that this adjustment may be made in the guide means instead of at the connection means. The slot or rods may have graduations 327, 329 inscribed or painted on it in 0.10 of a foot increments or some other desired increments to assist in setting the horizontal distance from the shovel blade to the previously constructed structure. The combination of slot 123 and rod 113, FIG. 4, is an example of a plurality of guide means for horizontal adjustment. FIG. 9 shows another example of a plurality of guide means 179 and 318 for horizontal adjustment.

In order to obtain vertical adjustment or adjustment parallel to the shovel blade side, the guide means 118 may be adjusted by moving the guide means up or down a vertical guide means or rod 116, FIG. 1. (If greater vertical distances are required, the connection means or brackets 113, FIG. 1; 112, FIG. 5 may be moved up the shovel handle 110; or 127, 129 FIG. 7 may be moved up respectively members 111, 109 and shovel handle 110.) The vertical guide means is connected at its lower end to the guide means and its upper end is connected to the connecting means. Or the vertical guide means may be fabricated as a slot 146 integral with the guide means and connection means as shown in FIG. 5. Once the height is achieved, the guide means 118 is secured tightly to the vertical portion 144 of member 142 to lock the guide means at the desired elevation. The vertical guide means may have graduations 221 inscribed or painted on it in 0.10 of a foot or some other desired increments to assist in setting the elevation of the guide means above the shovel blade bottom.

The guide means 118 may extend beyond the side edge of the shovel blade as in FIG. 1 so that when the user of the invention walks parallel to the curb or other structure, the guide means is pushed against the shovel blade. This feature gives the guide means horizontal support as the user walks parallel to curb removing the debris adjacent to the gutter so that there is no significant horizontal movement of the guide means with respect to the shovel blade. This same feature may be achieved by the use of at least one horizontal member 120, that is secured to, FIG. 5A, or locates against, FIG. 5, the shovel. They may be rotatably secured to the guide means 118 to allow the user to rotate the horizontal member 120 out of the way of the shovel blade if the user desires to rotate the guide means to the opposite side of the shovel. The member 120 when rotated would pivot about its point of connection. This point may be located on the guide means as illustrated in FIG. 5 which shows the pivot point and connection is a nut and bolt combination 137 located through guide means 118. If this connection was made to the shovel, the portion of member 120 in the proximity of the guide means 118 would be located as shown in FIG. 5A, so that as the guide means 118 is moved parallel to a previously constructed surface, the guide means is held in place by member 120 as the guide means resists frictional forces when the shovel is moved forward. A horizontal member 120 should be located on the right and left side of the shovel blade so that when the guide means 118 is rotated about the handle from one side of the shovel blade to the other side of the shovel blade, the guide means will remain parallel to the shovel blade. FIG. 5A shows the horizontal means 120A in an extended direction in dashed lines and rotated parallel to the shove blade edge in solid lines.

Figure 7:
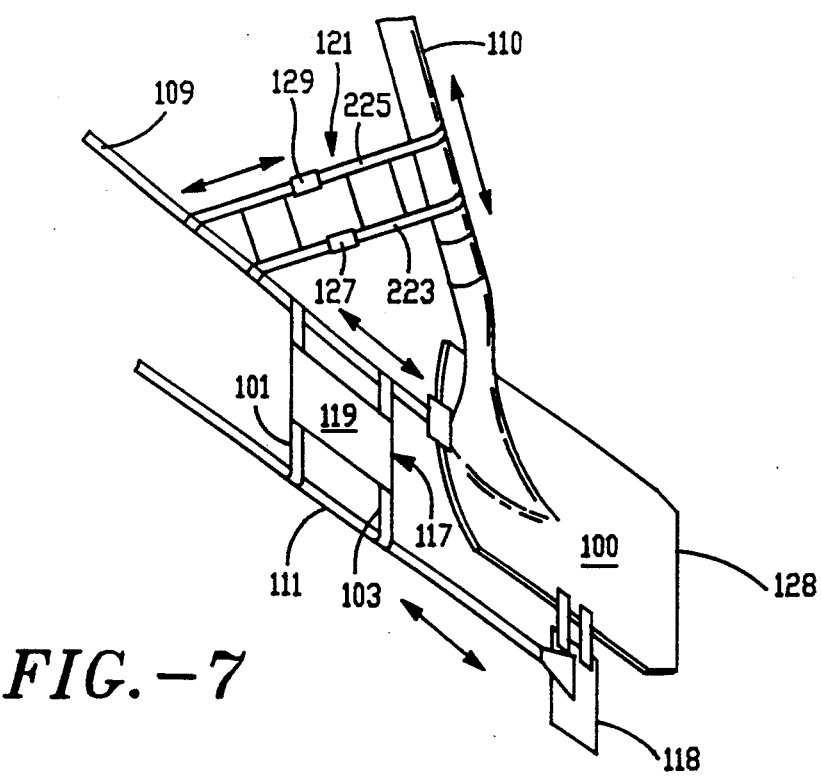
FIG. 7 illustrates an alternate embodiment of the invention.

Another embodiment of my invention is shown in FIG. 7. The guide means that locates on the top of the curb or other previously constructed structure is 118. The vertical guide means is a plurality of rods 109 and 111. Rod 111 is connected at its lower end to the guide means and is connected along its length to the second rod 109 by means of a first connection means. The first connection means 117 is made of a pair of rods 101 and 103 with spacer 119 to give additional strength to the pair of rods. The connection means can be moved up or down the rods 109 and 111 that make up the vertical guide means to obtain the desired elevation for the guide means with respect to the shovel bottom 128 and the top of the previously constructed structure. One end of the second rod 109 of the vertical guide means is connected to or rests against the top of the shovel blade 100. The rod 109 is also connected to a second connection means 121. The second connection means is made of a pair of adjustable length rods 123 and 125. The rods 223, 225 are slidably connected at each of their ends. One end of each of the rods 223, 225 is connected to rod 109 of the vertical guide means and the other end is connected to handle 110. Both rods 223 and 225 are actually two rods; each external rod end is connected as described and the internal end of each are threaded. The threaded ends are screwed into threaded sleeves 127, 129. The rods are longitudinally adjusted by threading or unthreading connections 127, 129.

Figure 8:
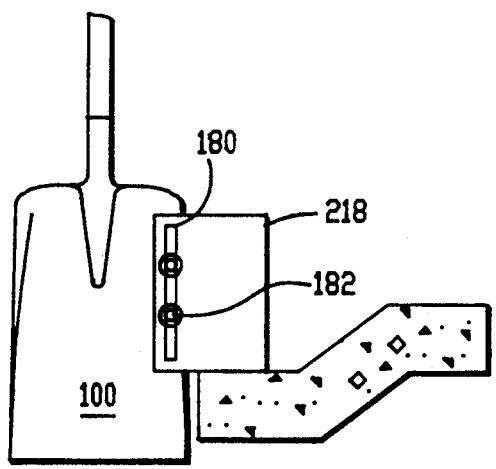
FIG. 8 illustrates another embodiment of the invention with guide means connected directly to the shovel blade.

My invention can also be assembled as illustrated in FIGS. 8 and 9. FIG. 8 illustrates the guide means 218 having a vertical cut out or slot 180 which allows the guide means to be adjusted along its length. It is secured by fasteners 182 to the shovel blade 100. The invention illustrated in FIG. 9 includes a means 184 for extending the guide means away from the shovel blade 100 - to accommodate the distance between the shovel blade and the previously constructed structure. This means is secured to the shovel by fasteners 182. The means for extending has a vertical slot 179 for vertical adjustment of the guide means with respect to the shovel blade bottom. The vertical slots shown in FIGS. 8 and 9 may have graduations inscribed or painted along them at predetermined intervals. The vertical slot of course could be fabricated in the guide means as shown in FIG. 8. In either case the extending means 184 or the guide means 318 may be interconnected by fastener 181 to other similar members to increase the distance the guide means may be located above the shovel bottom. Collectively these members are what is referred to in the claims as a plurality of guide means which are in horizontal alignment. One such extension 186 is illustrated in dashed lines in FIG. 9.

The foregoing presents and describes several embodiments of the invention. It is not intended to limit or otherwise narrowly construe the invention. The only limitations intended on the disclosed invention are those included in the appended claims.

What I claim:

1. An improvement to a shovel having a shovel blade and a handle extending from the shovel blade wherein the handle is connected to the shovel blade, the shovel blade and handle both having an upper and lower end and the shovel blade further having a front and back side and a right and left side, the improvement comprising a guide means for fixing the depth the shovel blade can clear away soil as a function of the distance between a stop surface of a previously constructed structure and the lower end of the shovel, said guide means locatable on the top surface of the previously constructed structure located parallel to the side of the shovel, means for adjustably connecting the guide means to the handle of the shovel, said connecting means both rotatably and slidably secured to the handle so that when the connecting means is loosened and not secured to the handle, the connection means can be located along the shovel handle to determine the distance of the guide means above the shovel blade's lower end as a function of the top surface of the previously constructed surface and when desired rotated about the handle so that the guide means may be located on either the right or left side of the shovel blade.

2. The shovel of claim 1 further including a vertical guide means for moving the guide means up and down with respect to the shovel blade's lower end, the vertical guide means adjustably connected to the means for connecting so that the guide means can be moved up and down to a predetermined elevation above the shovel blade's lower end.

3. The shovel of claim 2 wherein the vertical guide means has graduations of predetermined increments to assist a user to determine the elevation of the guide means above the bottom of the shovel.

4. The shovel of claim 2 further including at least one horizontal member extending from the guide means to the shovel blade, said horizontal member rotatably secured to the guide means so that when the horizontal member is rotated away from the shovel blade the guide means can be rotated around the shovel blade from one side of the shovel blade to the other side of the shovel blade, after which the horizontal member is rotated back so that at least one of the horizontal members is against the front of the shovel blade to prevent any significant movement of the guide means perpendicular to the shovel blade when the shovel is moved parallel to the previously laid structure.

5. The shovel of claim 2 wherein the connecting means has a horizontal slot wherein the vertical guide means may be slidably located along the slot to a predetermined distance horizontally from the shovel blade side so that when the predetermined distance from the shovel blade is reached, the vertical guide means is locked in place.

6. The shovel of claim 2 wherein the guide means has a horizontal slot wherein the vertical guide means may be slidably located so that when the correct distance of the guide means from the shovel blade is reached the vertical means is locked into place.

7. The shovel of claim 2 wherein the guide means extends onto the front side of the shovel blade so that when the shovel is moved parallel to the previously constructed structure, the guide means is pushed against the shovel blade to prevent significant movement of the guide means independent of the shovel blade in a direction perpendicular to the shovel as the shovel is held in a substantially vertical position and moved parallel to the previously positioned structure on which the guide means slides.

8. The shovel of claim 2 further including at least one horizontal member extending from the shovel blade to the guide means, said horizontal member rotatably secured to the shovel blade so that when the horizontal member is rotated away from the guide means, the guide means can be rotated around the shove blade from one side of the shovel blade to the other side of the shovel blade, after which the horizontal member is rotated back so that at least one of the horizontal members is against the guide means to prevent any significant movement of the guide means perpendicular to the shovel blade when the shovel is moved parallel to the previously laid structure.

9. An improvement to a shovel having a shovel blade and a handle extending from the shovel blade wherein the handle is connected to the shovel blade, the shovel blade and handle both having an upper and lower end and the shovel blade further having a front and back side and a right and left side, the improvement comprising a guide means, a member having an integral vertical portion and horizontal portion perpendicular to each other, each portion having an end, the end of the vertical portion of the member connected to the guide means, the end of the horizontal portion fabricated to encircle the handle of the shovel so that the end of the horizontal portion encircling the handle is slidably located on the handle, means for securing said encircling portion to the handle, a horizontal member extending from the guide means to the front of the shovel so that when a user of the shovel walks parallel to a previously constructed structure a predetermined amount of soil adjacent to the structure is removed without significant horizontal movement of the guide means with respect to the shovel blade.

10. The shovel of claim 9 wherein the vertical portion of the member has a slot and the guide means is adjustably connected to the slot of the vertical portion so that the guide means can be moved up and down the slot to obtain the desired elevation of the guide means above the lower end of the shovel blade.

11. The shovel of claim 10 wherein the vertical portion has graduations of predetermined increments along the slot of the vertical portion to determine the elevation of the guide means to the lower end of the shovel blade.

12. An improvement to a hand shovel having a shovel blade and a handle extending from the shovel blade where the handle is connected to the shovel blade, the shovel blade and handle both having an upper and lower end and the shovel blade further having a front and back side and a right and left side, the improvement comprising a guide means, said guide means having a vertical slot, the guide means movably secured to the shovel blade so that the guide means may be moved up and down to achieve a predetermined elevation of the guide means as a function of the shovel blade bottom and a top surface of a previously constructed surface and then secured at the predetermined elevation so that when the guide means is placed on the top surface of the previously constructed structure located parallel to the side of the shovel and the user of the shovel walks parallel to the structure, the guide means glides across the top surface of the structure and soil adjacent to the structure is removed by the shovel blade.

13. The hand shovel of claim 12 further comprising a means for extending the guide means a predetermined horizontal distance from the shovel blade, and extending means connected to the shovel blade and the guide means.

14. The hand shovel of claim 13 wherein said means for extending the guide means horizontally from the shovel blade further has a vertical slot so that the guide means may be moved up and down the slot to obtain the desired elevation of the guide means above the shovel bottom.

15. The hand shovel of claim 13 wherein the means for extending the guide means to the shovel blade has graduations at predetermined increments along the vertical slot to give the relative elevation of the guide means to the shovel blade bottom.

16. The hand shovel of claim 13 further comprising a plurality of means for extending which are connected in vertical alignment so as to allow the guide means to be located a greater distance above the bottom of the shovel blade than one such means for extending.

17. The hand shovel of claim 16 further comprising a plurality of guide means which are connected in horizontal alignment so as to allow the guide means to be located a greater distance from the shovel blade side adjacent to the structure than one guide means.

* * * * *